United States Patent
Nilsen et al.

(10) Patent No.: US 7,665,940 B2
(45) Date of Patent: Feb. 23, 2010

(54) FASTENER ASSEMBLY

(75) Inventors: Martin J. Nilsen, Hampshire, IL (US); Michael E. Ward, Geneva, IL (US)

(73) Assignee: Illinois Tool Works Inc., Glenview, IL (US)

( * ) Notice: Subject to any disclaimer, the term of this patent is extended or adjusted under 35 U.S.C. 154(b) by 650 days.

(21) Appl. No.: 11/508,649

(22) Filed: Aug. 23, 2006

(65) Prior Publication Data

US 2007/0167063 A1  Jul. 19, 2007

Related U.S. Application Data

(60) Provisional application No. 60/758,756, filed on Jan. 13, 2006.

(51) Int. Cl.
*F16B 31/02* (2006.01)

(52) U.S. Cl. .............................. 411/13; 411/258; 411/82

(58) Field of Classification Search ........................ None
See application file for complete search history.

(56) References Cited

U.S. PATENT DOCUMENTS

| | | | |
|---|---|---|---|
| 1,254,514 A | 1/1918 | Lehmann | |
| 1,988,813 A | 1/1935 | Seguin | |
| 2,456,234 A | 12/1948 | Young | |
| 3,638,978 A * | 2/1972 | Guntermann | ............... 403/267 |
| 3,789,726 A | 2/1974 | Gill et al. | |
| 4,295,761 A | 10/1981 | Hansen | |
| 4,322,193 A | 3/1982 | Stahl | |
| 4,373,309 A * | 2/1983 | Lutz | ............... 52/182 |
| 4,400,123 A | 8/1983 | Dunegan | |
| 4,709,654 A | 12/1987 | Smith | |
| 4,752,151 A * | 6/1988 | Ashida et al. | ............... 403/267 |
| 5,114,289 A | 5/1992 | Coiffman | |
| 5,120,174 A | 6/1992 | Patti | |
| 5,282,698 A | 2/1994 | Wright et al. | |
| 5,352,065 A | 10/1994 | Arnall et al. | |
| 5,383,740 A * | 1/1995 | Lancelot, III | ............... 403/267 |
| 5,472,302 A | 12/1995 | Yandle, II | |
| 5,518,351 A | 5/1996 | Peil | |
| 5,752,795 A | 5/1998 | D'Adamo | |
| 5,873,689 A | 2/1999 | Mensour et al. | |
| 6,135,691 A | 10/2000 | Nadarajah et al. | |
| 6,296,429 B1 | 10/2001 | Wright | |
| 6,443,680 B1 | 9/2002 | Bodin | |
| 6,896,462 B2 * | 5/2005 | Stevenson et al. | ............. 411/82 |
| 2005/0244216 A1 | 11/2005 | Magraw | |

FOREIGN PATENT DOCUMENTS

| | | |
|---|---|---|
| DE | 2707492 | 8/1978 |
| GB | 990402 | 4/1965 |

OTHER PUBLICATIONS

International Search Report for PCT/US2006/047204.

* cited by examiner

*Primary Examiner*—Gary Estremsky
(74) *Attorney, Agent, or Firm*—Mark W. Croll; Paul F. Donovan

(57) ABSTRACT

A fastener coupler includes a first securing member configured to receive and retain a first fastener within a first inner cavity, wherein at least one passage is formed through the first securing member, and a setting indication material within at least a portion of the first inner cavity. The setting indication material is configured to extrude through the first passage when the first fastener is urged into the setting indication material in order to indicate that the first fastener is properly secured to the first securing member.

17 Claims, 2 Drawing Sheets

2

FASTENER ASSEMBLY

RELATED APPLICATIONS

This application relates to and claims priority benefits from U.S. Provisional Patent Application No. 60/758,756 entitled "Fastener," filed Jan. 13, 2006, which is hereby incorporated by reference in its entirety.

FIELD OF THE INVENTION

Embodiments of the present invention generally relate to fasteners, and more particularly to cap fasteners, such as Sammy fastener assemblies, rod couplers, and the like.

BACKGROUND OF THE INVENTION

Cap fasteners, such as Sammy fastener assemblies, typically include caps of varying dimensions that are configured to mate with various screws or bolts of varying lengths and sizes. U.S. Pat. No. 5,518,351, entitled "Self-Tapping Screw Having Threaded Nut As A Head," and U.S. Pat. No. 6,443,680, entitled "Mounting Apparatus Having A Swivel Head," both of which are hereby incorporated by reference in their entireties, describe such fastening assemblies.

Sammy fastener assemblies may be used in various applications, but are commonly used to attach various items, such as pipes, lights, electrical equipment, and the like, to ceilings of associated structures. A Sammy fastener assembly includes a fastener fixedly secured to a Sammy cap. After the Sammy fastener assembly is installed into a ceiling, a threaded member, such as a rod, is threaded into a cap end of the Sammy fastener assembly. The threaded rod is used to secure a pipe support, electrical fixture, etc., to the Sammy fastener assembly. Typically, the Sammy fastener assembly serves as an anchor for mating components, and provides an overhead anchor with an internal thread to accept a threaded rod or other member. In one application, the Sammy fastener assembly secures sprinkler piping in commercial buildings for fire suppression systems. Further, such assemblies may be used to secure conduit to a ceiling.

In order to assemble a Sammy fastener assembly, a hex portion of a lag bolt, drill screw, masonry screw, or the like, is press fit into a slightly smaller, preferably round cylindrical counter bore of a Sammy cap. The cap typically includes a threaded section (about half the length of the cap) and a head attachment section (which usually includes two different diameter counter bores). The hex portion of a screw interferes with the rounded counter bore in the cap to provide torque transmission for the assembly. In other words, the cap and screw move together. That is, the screw does not move relative to the cap once secured within the cap. A counter bore of the Sammy screw is then folded or crimped over the underside of the cap of the screw, thereby further securely retaining the screw to the cap.

Proper attachment of the Sammy screw to its mating structure (e.g., ceiling) and the attachment of the mating rod to the Sammy fastener assembly is important to ensure that the Sammy fastener assembly will properly secure a component to the structure. Typically, the Sammy fastener assemblies are inspected to ensure that the correct length Sammy screw was installed into a structure, such as a ceiling or post. However, such inspection is not always quick, easy or accurate.

Thus, a need exists for a system and method of quickly, easily, and accurately ensuring that a fastening assembly is properly secured to a structure. Further a need exists for a system and method of ensuring that a component is properly secured to the fastening assembly.

SUMMARY OF THE INVENTION

Certain embodiments of the present invention provide a fastener assembly that includes a fastener coupler including a first securing member having first outer walls defining a first inner cavity, wherein a first passage is formed through at least one of the first outer walls into the first inner cavity. A first fastener is configured to be secured within the first inner cavity.

A setting indication material is retained within at least a portion of the first inner cavity. The setting indication material is configured to extrude through the first passage when the first fastener engages the setting indication material within the first inner cavity. Extrusion of the setting indication material through the first passage indicates that the first fastener is properly secured to the first securing member.

The fastener assembly may also include a second securing member integrally connected to the first securing member. The second securing member has second outer walls integrally connected to the first outer walls, and a second inner cavity defined between the second outer walls. A second fastener is configured to be secured within the second inner cavity. A central web, disc, base, tab, or the like may be positioned between the first securing member and the second securing member, such that the central web separates the first inner cavity from the second inner cavity. Additional setting indication material may be retained within the second inner cavity, and the second securing member may also include a second passage through which the additional setting indication material may pass.

The setting indication material may be an adhesive resin that is configured to move through the first passage in a direction that is perpendicular to a longitudinal axis of the first outer walls. Further, the setting indication material may include different colored layers. The different colors of the setting indication material may denote different fastener securing levels as the fastener engages the fastener coupler.

Figure 1:
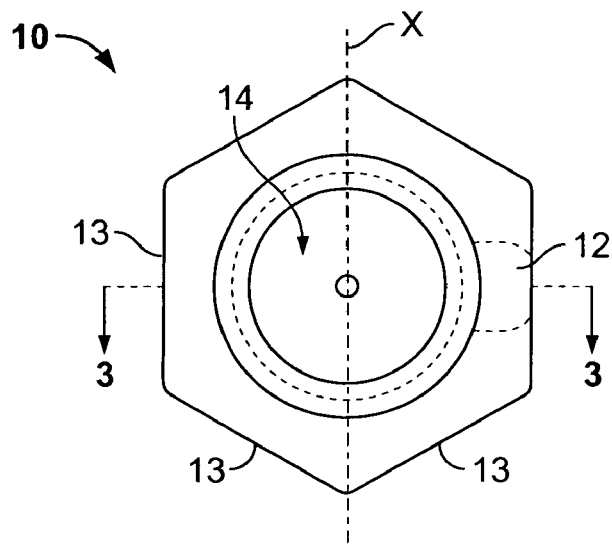
FIG. 1 illustrates a top plan view of a fastener coupler according to an embodiment of the present invention.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE INVENTION

FIG. 1 illustrates a top plan view of a fastener coupler 10 according to an embodiment of the present invention. The fastener coupler 10 may be formed of various materials, such as metal or plastic. The fastener coupler 10 includes a generally hexagonal main body 12 having an axial cavity 14 defined between outer walls 13. The axial cavity 14 is positioned about a longitudinal axis X of the fastener coupler 10.

Figure 2:
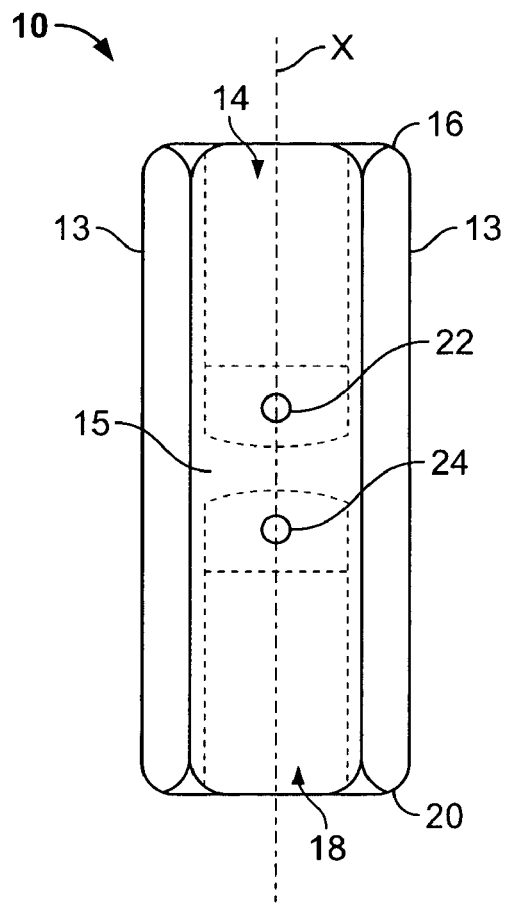
FIG. 2 illustrates a longitudinal elevational view of a fastener coupler according to an embodiment of the present invention.

FIG. 2 illustrates a longitudinal elevational view of the fastener coupler 10. The fastener coupler 10 includes the cavity 14 formed through a first end 16, and another axial cavity 18 formed through a second end 18. The cavity 14 is open at the first end 16, while the cavity 18 is open at the second end 18. The fastener coupler 10 is configured to receive and retain a first fastener, such as a screw (not shown in FIG. 1) through the first end 16, and a second fastener, such as a threaded rod (not shown in FIG. 1) through the second end 20.

A central web 15 integrally spans between the walls 13 at a center of the fastener coupler 10. Optionally, the web 15 may be positioned at areas other than the center of the fastener coupler 10. The central web 15 separates the cavities 14 and 18 from one another.

A passage 22 is formed through at least one of the walls 13 proximate the web 15. The passage 22 connects to the cavity 14 within the fastener coupler 10. As shown in FIG. 2, the passage 22 is located proximate a bottom of the cavity 14. Similarly, a passage 24 is formed through at least one of the walls 13 proximate the web 15. The passage 24 connects to the cavity 18 within the fastener coupler 10. The passage 24 is located proximate a top of the cavity 18.

While the fastener coupler 10 is shown having two passages 22 and 24, more or less passages may be used. For example, the fastener coupler 10 may include a passage formed through each wall 13.

Figure 3:
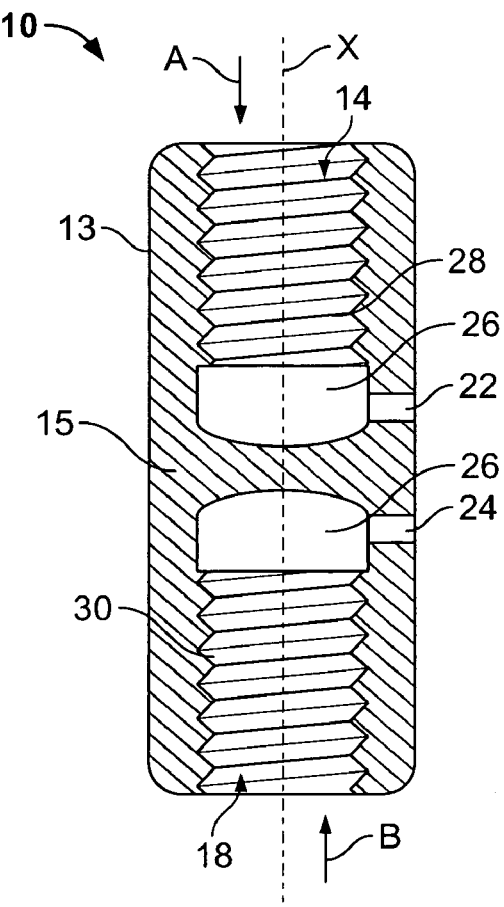
FIG. 3 illustrates a longitudinal cross-sectional view of a fastener coupler through line 3-3 of FIG. 1.

FIG. 3 illustrates a longitudinal cross-sectional view of the fastener coupler 10 through line 3-3 of FIG. 1. Threads 28 and 30 are formed on interior surfaces of walls 13 within the cavities 14 and 18, respectively. The threads 28 and 30 are configured to threadably engage corresponding surfaces of fasteners (not shown). Setting indication material 26 is deposited and retained within each cavity 14 and 18. The setting indication material 26 may be an adhesive resin that is a dry solid film.

Setting indication material 26 is positioned in the cavity 14 over the web 15 and proximate the passage 22. Setting indication material 26 is also positioned in the cavity 18 under the web 15 and proximate the passage 24. The setting indication material 26 is configured to be retained within cavities 14 and 18.

A fastener, such as a screw (not shown), is securely threaded into the fastener coupler 10 in the direction of arrow A. As the fastener moves into the cavity 14 in the direction of arrow A, a distal end of the fastener encounters the setting indication material 26 within the cavity 14. As the fastener continues to move in the direction of arrow A, the web 15 blocks the setting indication material 26 within the cavity 14 from moving in the direction of arrow A. Thus, the movement of the fastener into the setting indication material 26 within cavity 14 toward the web 15 in the direction of arrow A extrudes, or otherwise forces, the setting indication material 26 through the passage 22. Movement of the setting indication material 26 through the passage 22 indicates that the fastener is properly securing to the fastener coupler 10.

Another fastener, such as a threaded rod (not shown), is securely threaded into the fastener coupler 10 in the direction of arrow B. As the fastener moves into the cavity 18 in the direction of arrow B, a distal end of the fastener encounters the setting indication material 26 within the cavity 18. As the fastener continues to move in the direction of arrow B, the web 15 blocks the setting indication material 26 within the cavity 18 from moving in the direction of arrow B. Thus, the movement of the fastener into the setting indication material 26 within cavity 18 toward the web 15 in the direction of arrow A extrudes, or otherwise forces, the setting indication material 26 through the passage 24. Movement of the setting indication material 26 through the passage 22 indicates that the fastener is properly secured to the fastener coupler 10.

The setting indication material 26 within each cavity 14 and 18 may have different colored layers. For example, the layer of setting indication material proximate the web 15 may be a first color, while the later of setting indication material furthest away from the web 15 may be a second color. As the setting indication material 26 moves through the passages 22 and 24, proper and secure attachment of the fasteners to the fastener coupler 10 may be indicated when the extruded setting indication material changes color.

As shown in FIG. 3, for example, the setting indication material 26 is positioned within a central portion of the fastener coupler 10 about a longitudinal axis X. Movement of fasteners in the directions of arrows A and B (which is parallel with respect to the axis X) into direct contact with the setting indication material 26 forces the setting indication material 26 through the passages 22 and 24 in directions that are perpendicular to the axis X.

While the fastener coupler 10 is shown having two cavities 14 and 18 with setting indication material 26, the fastener coupler 10 may, alternatively, include only one cavity with setting indication material. Further, the fastener coupler 10 may not include the web 15. Instead, setting indication material may be deposited within a central portion of a threaded coupler.

Figure 4:
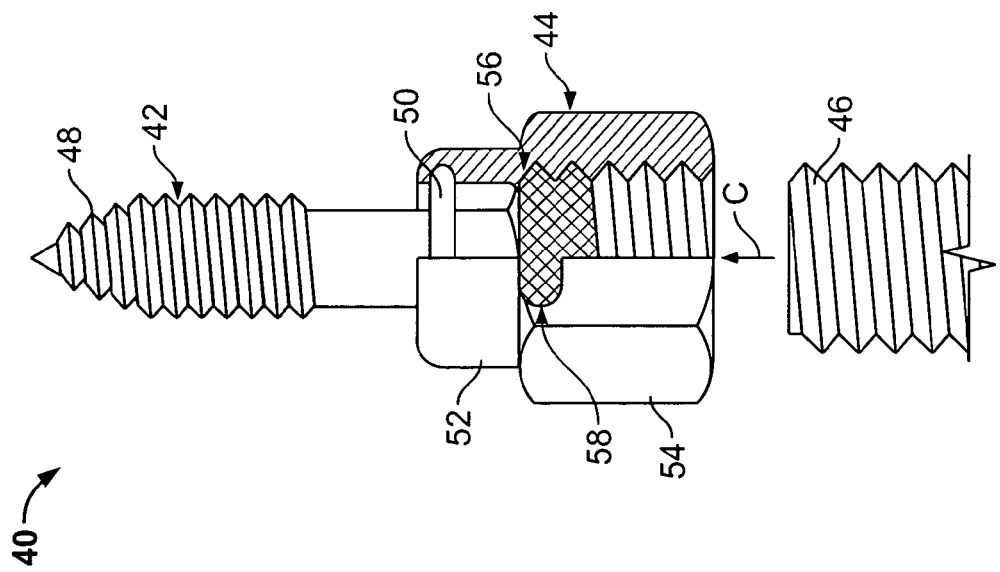
FIG. 4 illustrates an elevational view of a fastener assembly according to an embodiment of the present invention.

FIG. 4 illustrates an elevational view of a fastener assembly 40 according to an embodiment of the present invention. The fastener assembly 40 includes a fastener 42, such as a screw, a fastener coupler 44, such as a Sammy cap, and a fastener 46, such as a threaded rod.

The screw 42 includes a threaded securing end 48 integrally connected to a hex head 50. The threaded securing end 48 is configured to threadably secure into a structure, such as a ceiling.

The fastener coupler 44 (a portion of which is shown in cross-section) includes a rounded counter bore 52 integrally connected to larger rod receiving head 54. The rod receiving head 54 has a larger outer circumference or perimeter than the rounded counter bore 52.

The rounded counter bore 52 is crimped around the hex head 50 of the screw 42. Thus, the screw 42 is fixedly secured to the counter bore 52 such that the screw 42 does not move relative to the counter bore 52.

Setting indication material 56 is retained within the rod receiving head 54 of the fastener coupler 44. The setting indication material 56 may be positioned proximate the union of the rod receiving head 54 and the counter bore 52. A passage 58 is formed through the rod receiving head 54 proximate the union of the rod receiving head 54 and the counter bore 52. The passage 58 is configured to allow the setting indication material 56 to pass therethrough when the rod 46 is secured into the fastener coupler 44.

As the rod 46 moves into the fastener coupler 44 in the direction of arrow C, the distal end of the rod 46 encounters the setting indication material 56. The head 50 of the screw 42 blocks the setting indication material 56 from further movement in the direction of arrow C. Thus, setting indication material 56 is extruded, or otherwise forced, through the passage 58 due to the force exerted on the setting indication material 56 by the rod 46 and the head 50 of the screw 42. Movement of the setting indication material 56 out of the passage 58 indicates that the rod 46 is properly secured to the fastener coupler 44.

As noted above, the setting indication material 56 may include different layers of color to denote different securing levels. Further, the fastener coupler 44 may have more passages than those shown. For example, the rounded counter bore 52 may include a passage in which setting indication material may pass in order to indicate that the screw 42 is properly secured to the fastener coupler 44.

Figure 5:
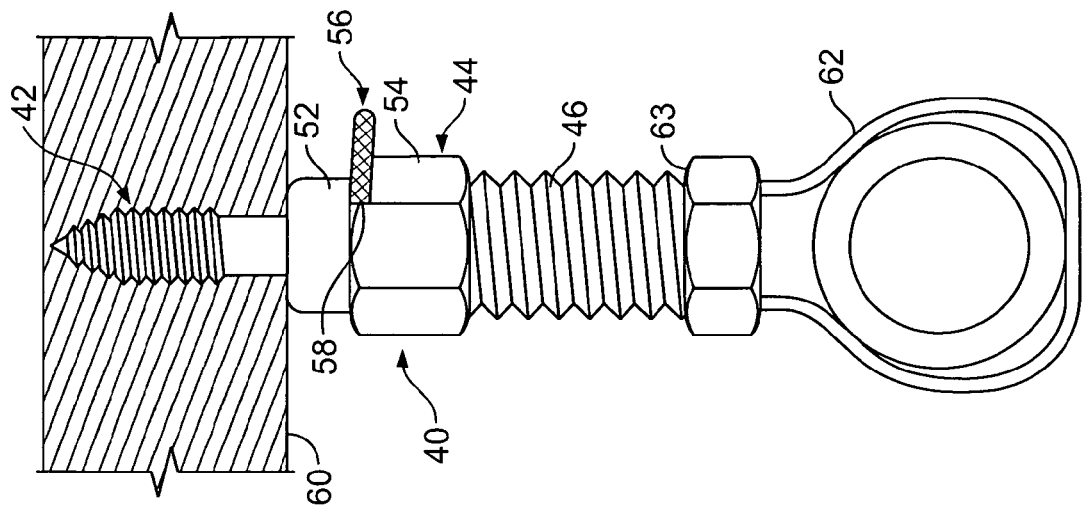
FIG. 5 illustrates an elevational view of a fastener assembly properly secured to a structure, while securely retaining a component according to an embodiment of the present invention.

FIG. 5 illustrates an elevational view of the fastener assembly 40 properly secured to a structure 60, such as a ceiling, while securely retaining a component 62, such as a pipe, according to an embodiment of the present invention. The screw 42 is secured to the ceiling 60. The rod 46 is securely mated into the rod receiving head 54 of the fastener coupler 44, as discussed above with respect to FIG. 4. Proper attachment of the rod 46 to the fastener coupler 44 is indicated when the setting indication material 56 extrudes through the opening 58 formed through the rod receiving head 54.

A support 62 is coupled to an end 63 of the rod 46 that is distally located from the fastener coupler 44. The support 62 may securely retain a pipe, conduit, or the like. The support 62 may include a fastener coupler having setting indication material in order to indicate that the support 62 is properly set with respect to the rod 46.

Under stress, i.e., when a fastener exerts a force into the setting indication material, the setting indication material may slightly liquefy, enabling the setting indication material to flow out the passage(s). Once the stress diminishes, i.e., movement of the fastener within the fastener coupler stops, the setting indication material re-solidifies. Various materials may be suitable for use with embodiments of the present invention, including DRI-LOK 204, commercially available from Forest City Technologies in Rockford, Ill., or similar materials commercially available from Loktite Industries or N-D Industries.

Thus, embodiments of the present invention provide a system and method of quickly, easily, and accurately ensuring that a fastening assembly is properly secured to a structure. That is, embodiments of the present invention provide an easily verifiable system and method of determining whether a fastener is properly set with respect to a fastener coupling.

While various spatial terms, such as upper, lower, mid, lateral, horizontal, vertical, and the like may used to describe portions of the fastener assembly and coupler, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A fastener coupler comprising:
   a first securing member having outer walls defining a first inner cavity, said first inner cavity configured to receive and retain a first fastener, wherein a first passage is formed through at least one of said outer walls into said first inner cavity; and
   a setting indication material within at least a portion of said first inner cavity, said setting indication material being configured to extrude through said first passage when the first fastener is urged into said setting indication material, wherein extrusion of said setting indication material through said first passage indicates that the first fastener is properly secured to said first securing member, wherein said setting indication material comprises different colored layers.

2. The fastener coupler of claim 1, further comprising a second securing member integrally connected to said first securing member, said second securing member having a second inner cavity, said second inner cavity configured to receive and retain a second fastener.

3. The fastener coupler of claim 2, further comprising a central web spanning between said first securing member and said second securing member, said central web separating said first inner cavity from said second inner cavity.

4. The fastener coupler of claim 2, further comprising additional setting indication material within said second inner cavity, wherein said second securing member has a second passage formed therethrough.

5. The fastener coupler of claim 2, wherein said second securing member comprises a rounded counter bore, wherein the second fastener is a screw having a head fixedly secured within said rounded counter bore.

6. The fastener coupler of claim 1, wherein said setting indication material is an adhesive resin.

7. The fastener coupler of claim 1, wherein said setting indication material is configured to move through said first passage in a direction that is perpendicular to a longitudinal axis of said outer walls.

8. A fastener assembly comprising:
   a fastener coupler comprising a first securing member having first outer walls defining a first inner cavity, wherein a first passage is formed through at least one of said first outer walls into said first inner cavity;
   a first fastener configured to be secured within said first inner cavity; and
   a setting indication material within at least a portion of said first inner cavity, said setting indication material being configured to extrude through said first passage when said first fastener engages said setting indication material within said first inner cavity, wherein extrusion of said setting indication material through said first passage indicates that said first fastener is properly secured to said first securing member, wherein said setting indication material comprises different colored layers.

9. The fastener assembly of claim 8, further comprising a second securing member integrally connected to said first securing member, said second securing member having second outer walls integrally connected to said first outer walls, and a second inner cavity defined between said second outer walls.

10. The fastener assembly of claim 9, further comprising a second fastener secured within said second inner cavity.

11. The fastener assembly of claim 9, further comprising a central web spanning between said first securing member and said second securing member, said central web separating said first inner cavity from said second inner cavity.

12. The fastener assembly of claim 9, further comprising additional setting indication material within said second inner cavity, wherein said second securing member has a second passage formed therethrough.

13. The fastener assembly of claim 10, wherein said second securing member comprises a rounded counter bore, wherein said second fastener is a screw having a head fixedly secured within said rounded counter bore.

14. The fastener assembly of claim 8, wherein said setting indication material is an adhesive resin.

15. The fastener assembly of claim 8, wherein said setting indication material is configured to move through said first passage in a direction that is perpendicular to a longitudinal axis of said first outer walls.

16. The fastener assembly of claim 8, wherein said first fastener is a threaded rod configured to securely retain a support member.

17. A fastener coupler comprising:

a first securing member configured to receive and retain a first fastener within a first inner cavity, wherein at least one passage is formed through said first securing member; and a setting indication material within at least a portion of said first inner cavity, said setting indication material being configured to extrude through said first passage when the first fastener is urged into said setting indication material in order to indicate that the first fastener is properly secured to said first securing member;

a second securing member integrally connected to said first securing member, said second securing member having a second inner cavity, said second inner cavity configured to receive and retain a second fastener; and a central web spanning between said first securing member and said second securing member, said central web separating said first inner cavity from said second inner cavity, wherein said setting indication material is an adhesive resin having different colored layers, said setting indication material being configured to move through said first passage in a direction that is perpendicular to a longitudinal axis of said outer walls.

* * * * *

UNITED STATES PATENT AND TRADEMARK OFFICE
CERTIFICATE OF CORRECTION

PATENT NO. : 7,665,940 B2
APPLICATION NO. : 11/508649
DATED : February 23, 2010
INVENTOR(S) : Nilsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 834 days.

Signed and Sealed this

Seventh Day of December, 2010

David J. Kappos
*Director of the United States Patent and Trademark Office*